3,035,003
MANUFACTURE OF PIGMENTED THERMO-
PLASTIC MATERIAL
Jacob Christoffel Ferdinand Kessler, Velp, Netherlands,
assignor to American Enka Corporation, Enka, N.C.,
a corporation of Delaware
No Drawing. Filed Nov. 4, 1957, Ser. No. 694,114
Claims priority, application Netherlands Nov. 14, 1956
1 Claim. (Cl. 260—28.5)

This invention relates to the manufacture of thermoplastic articles having a pigment dispersed therein and more particularly to the manufacture of thermoplastic articles extruded from grains of synthetic thermoplastic polymers into ribbons, films, threads and the like, the grains carrying a uniform coating of an inorganic or organic pigment.

It is known to incorporate a pigment in thermoplastic material. For example, in a very practical manner the incorporation may be accomplished simply by mechanically dry mixing the pigment and the plastic material in granular form with the pigment adhering to the surface of the plastic grains and thereafter extruding the grains. The mixing may be accomplished by rolling grains of thermoplastic material with a desired quantity of powdery pigment before the grains are fed to an extrusion device. In this way, the grains are covered with a thin layer of pigment and can be processed in any suitable extrusion device into pigmented thermoplastic articles without requiring the use of an autoclave for incorporating the pigment in the thermoplastic polymer.

It is also possible to add the pigment while the grains of thermoplastic material are being fed to the extrusion device, so that mixing is produced within the extrusion device.

While carrying out the aforesaid methods, it was found that the extruded articles are rather unevenly pigmented and have pigment conglomerates that protrude from the surface, giving the articles a rough appearance. The problem of obtaining uniform pigmentation is more pronounced when relatively large amounts of pigment are used.

It is therefore an object of this invention to provide a process of producing uniformly high-pigmented synthetic thermoplastic polymeric articles.

Another object of this invention is to provide a thermoplastic extrusion material having a pigment uniformly distributed and dispersed thereon.

These and other objects are accomplished by comminuting thermoplastic material into small grains, tumbling the grains with a powdery pigment in the presence of a molten paraffin wax having a melting point of at least 30° C. but below the melting point of the thermoplastic material and thereafter extruding the material. The extruded article is uniformly pigmented and has a smooth surface free from pigment conglomerates.

The grains used in accordance with the present invention may be the commercially obtainable, granulated, thermoplastic injection molding material that consists of granules having a diameter of about 2–5 mm. and a surface area per granule of about 12–80 mm.² These grains usually have the shape of small cylinders, the height of which is about equal to the diameter in order that they approach a spherical shape.

Examples of thermoplastic material to which the present invention is applicable include polycarprolactam, polyhexamethylene-adipamide, polyhexamethylene - sebacamide, linear polyesters of glycols such as ethylene glycol and terephthalic acid, homopolymers of acrylonitrile and heteropolymers containing combined acrylonitrile, vinyl polymers, vinyl copolymers such as vinyl chloride, vinyl acetate copolymers, and other thermoplastic polymeric materials capable of being brought to a plastic state.

The pigment must be finely divided with the preferred pigment particle size being not more than 1 micron. The pigment can be inorganic, such as titanium dioxide, or a sufficiently heat-resistant organic pigment such as carbon black or a mixture of suitable pigments. The amount of pigment depends, of course, upon the degree of coloring or dullness desired.

Various kinds of paraffin wax may be used in practicing the present invention, the only material requirement being that the melting point thereof is at least 30° C. in order to prevent conglutination of the grains at room temperature. Paraffin wax with a melting point above 60° C. is, however, preferred. The amount of wax used depends upon the proportion and type of pigment added, with 0.1 to 1.5% by weight of wax based on the polymer ordinarily being sufficient to prevent conglomeration of the pigment particles and surface roughness in the products formed from the grains.

According to the present invention, the paraffin wax and the pigment may be mechanically mixed with the grains of thermoplastic material in different ways, such as by being tumbled in a rotating mixing drum.

It was found that the three substances (grains, pigment and paraffin wax) may be mixed in a variety of ways. Thus, in one embodiment of the present invention the grains may be rolled simultaneously with the paraffin wax and the powdered material at a temperature above the melting point of the paraffin wax. Moreover, it is also possible, according to another embodiment of the present invention, to roll the grains first with paraffin wax at a temperature above the melting point of the wax and cool the material in order to solidify the wax. Thereafter the wax coated grains are rolled with the pigment. However, the latter embodiment is preferred since better adhesion of the paraffin wax and the pigment to the grains of thermoplastic material is attained therewith.

In order to prevent the formation of foam during extrusion, the grains at extrusion should preferably not contain more than 0.1% by weight of moisture. Therefore, the mechanical mixing of the grains with the paraffin wax and the pigment is preferably carried out while maintaining the moisture content in the substances at a maximum of 0.1% by weight.

The wax coating on the grains produced according to the present invention tends to prevent absorption of moisture by the grains from their environment.

It was found that the coated granular material prepared by the present invention is exceedingly stable and may be stored for extended periods and transported while retaining a permanent distribution of the pigment over the grains of thermoplastic material. As a result of this, it is possible to mix the pigment and grains long before extrusion.

The coated grains of the present invention can be extruded either by the discontinuous method of injection molding by which objects of limited dimensions are obtained or by the continuous method of producing objects of infinite length.

It is furthermore possible according to the invention to obtain an extrusion material which can be horizontally extruded if the grains are not only rolled with the paraffin wax and the powdered material but also with a so-called thickening agent. Copending application, Serial No. 514,666, now U.S. Patent No. 2,959,570, discloses thickening agents that have no appreciable effect on extrusion polymers at ordinary room temperature, but do thicken polymer when in a molten condition so that self-supporting shaped products may be readily formed by extrusion. Examples of substances having a thickening effect include esters of phosphoric or phosphorous acid which may be substituted with halogen, namely, alkyl phosphites such as tributyl phosphite, diethyl phosphite and dibutyl phosphite, aryl phosphites such as triphenyl phosphite, alkyl or aryl phosphites which may be substituted with halogen, such as diethyl-β-chloroethyl phosphate, phenyl-bis-p-chlorophenyl phosphate, trichloroethyl phosphate, tri-chloropropyl phosphate, ethyl-bis-β-chloroethyl phosphate, trichloroethyl phosphate and furthermore bis-chloromethylene-m-xylene, polyallyl chloride, tetraethyl pyrophosphate, bis - (chloroethyl) - sulphate, tri - n-butyl borate, p-xylylene dichloride, glycerol trichloroacetate, bis - bromomethylene - m - xylene, p-bis(epoxypropoxy)-benzene, bis-β-chloroethyl vinyl phosphate, 2,4-dimethylphenol, 2,4-dimethylol-6-chlorophenol and terephthalic dialdehyde, and mixtures of these.

As above stated, it is within the scope of the present invention to disperse a pigment into a variety of thermoplastic polymeric materials. However, where the material selected is polycaprolactam, a special processing technique is preferred because of economic considerations. The water soluble content in polycaprolactam must be reduced to a value less than 4.5% by weight. This is accomplished by washing grains of polycaprolactam with water and then drying the grains in a rotary drier at a temperature of about 100° C. under reduced pressure while being tumbled therein. Immediately thereafter the hot dried grains are rolled in the drier first with paraffin wax added in a liquid condition and then with the pigment under the same pressure and temperature conditions used during drying. After the pigment is evenly dispersed on the surface of grains, the grains are cooled in order to solidify the wax coating.

The following examples further illustrate the practice of the present invention.

Example I

Grains of a polyamide having a specific viscosity of 1.4 were formed from polycaprolactam which had been prepared by polycondensation of ε-caprolactam in the presence of 0.1% by weight of phosphoric acid as a stabilizer. These grains contained about 2% by weight of water soluble components. At a temperature of 100° C. the grains were rolled in a tumbling device for 15 minutes with 0.5% by weight of a paraffin wax having a melting point of about 85° C. Next 4.0% by weight of titanium dioxide, calculated on the weight of the polycaprolactam, was added, after which rolling was continued for 15 minutes at the same temperature. The grains were then cooled while being tumbled. As soon as the temperature of the coated grains had dropped to 75° C., rolling was discontinued.

The grains thus produced were shaped into a ribbon having a thickness of 0.2 mm. by means of an extrusion machine. The ribbon showed no conglomerates of titanium dioxide particles and had a smooth surface.

Example II

In the way indicated in Example I, polyamide grains having a specific viscosity of 1.1 and a moisture content of 0.1% by weight and obtained by polycondensation of hexamethylene diamine and adipic acid, were rolled for 15 minutes at 80° C. with 0.3% by weight of paraffin wax having a melting point of about 60° C. The grains were then cooled to 45° C. while being tumbled. Next, an amount of 1.0% by weight of carbon black, calculated on the weight of the polymer, was added, whereupon rolling was continued for another 30 minutes.

The grains thus produced were extruded into 20 denier monofilament. The carbon black was uniformly dispersed in the filament, the surface of which being perfectly smooth in appearance.

Example III

Grains of polyethylene terephthalate having a specific viscosity of 0.65 and a moisture content of 1.0% by weight were dried in a stream of hot air until the moisture content was reduced to 0.003% by weight. These dried polyester grains were rolled at 100° C. for 15 minutes with 0.9% by weight of a paraffin wax having a melting point of 85° C. Then, an amount of 6.0% by weight of titanium dioxide, calculated on the weight of the polyester was added, whereupon rolling was continued for another 15 minutes at the same temperature. Rolling was discontinued after the grains were cooled to a temperature of 75° C.

The grains thus produced were shaped into a ribbon having a thickness of 0.1 mm. by means of an extrusion machine. The ribbon showed no conglomerates of titanium dioxide particles and a smooth surface.

Example IV

Polycaprolactam grains of the type described in Example I were rolled for 15 minutes at 100° C. with 0.9% by weight of paraffin wax having a melting point of 85° C. Then, an amount of 0.5% by weight of tributyl phosphite, calculated on the weight of the polyamide, was added, whereupon rolling was continued for 15 minutes at the same temperature. Finally, an amount of 4.0% of titanium dioxide, calculated on the weight of the polyamide, was added, whereupon rolling was continued for another 15 minutes at the same temperature. After this operation, the grains were cooled to 75° C. while being tumbled.

The grains thus produced were fed into an extrusion machine which extruded the grains horizontally in the atmosphere into a tube having a diameter of 30 mm. and a wall thickness of 2.5 mm. A cross section of the tube showed a smooth surface with the pigment being uniformly distributed throughout the tube.

Although specific embodiments of the present invention have been described, other embodiments obvious from the teaching herein to those skilled in the art are contemplated to be within spirit and scope of the invention defined in appended claim.

What is claimed is:

Process for the preparation of extrudable pigmented thermoplastic polymeric material yielding upon extrusion articles characterized by uniform pigmentation, said process comprising drying grains of thermoplastic polymeric material selected from the group consisting of polycaprolactam and polyethylene terephthalate until the grains have a moisture content of at most 0.1% by weight, tumbling the dried grains with molten paraffin wax at a temperature of 85 to 100° C. and in an amount of 0.1 to 1.5% by weight, cooling the wax-treated grains to solidify the coating of wax thereon, and then tumbling the cooled wax-coated grains of thermoplastic polymeric material with a powdery pigment selected from the group consisting of titanium oxide and carbon black whereby the pigment adheres to the wax coating on the grains.

References Cited in the file of this patent

UNITED STATES PATENTS

| | | |
|---|---|---|
| 1,676,739 | Marckworth | July 10, 1928 |
| 2,127,381 | Herrmann et al. | Aug. 16, 1938 |
| 2,136,450 | Marks | Nov. 15, 1938 |
| 2,277,788 | Shipp et al. | Mar. 31, 1942 |
| 2,358,963 | Davies | Sept. 26, 1944 |
| 2,497,346 | Collins | Feb. 14, 1950 |
| 2,714,076 | Seckel | July 26, 1955 |
| 2,945,827 | Henning | July 19, 1960 |